(12) United States Patent
Hayata

(10) Patent No.: US 6,356,542 B1
(45) Date of Patent: Mar. 12, 2002

(54) RECEPTION PATH SEARCH METHOD AND SEARCHER CIRCUIT OF CDMA RECEPTION DEVICE

(75) Inventor: Toshihiro Hayata, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/511,303

(22) Filed: Feb. 23, 2000

(30) Foreign Application Priority Data

Feb. 24, 1999 (JP) .......................................... 11-046732

(51) Int. Cl.⁷ .......................... H04B 7/216; A61F 2/06; H04L 27/30
(52) U.S. Cl. ........................ 370/342; 375/147; 370/519
(58) Field of Search .............................. 370/342, 320, 370/335, 441, 514, 515, 516, 517, 519; 375/130, 140, 142, 136, 141, 150, 134, 137, 215, 147, 148, 149, 153

(56) References Cited

U.S. PATENT DOCUMENTS 5,937,014 A * 8/1999 Pelin et al. .................. 375/340

* cited by examiner

Primary Examiner—Seema S. Rao
Assistant Examiner—Phirin Sam
(74) Attorney, Agent, or Firm—Young & Thompson

(57) ABSTRACT

A reception path search method and a searcher circuit for use in a CDMA reception device in which a delay profile is generated is provided. The delay profile reflects change of the state of a reception path more appropriately. A fading vector which is subjected to a weighted-averaging is calculated from a delay profile of a vector value obtained in every fixed cycle. A phase angle of the fading vector which is subjected to the weighted-averaging is compared with a phase angle of the fading vector which is subjected to the weighted-averaging calculated previously. An absolute value of difference of both phase angles is within a fixed threshold value. On this occasion, an the in-phase-addition of the delay profile of the above vector value continues. The delay profile which is subjected to the in-phase-addition is maintained. While when the absolute value of the angle difference becomes more than the threshold value, the in-phase added delay profile is subjected to a power-addition to generate a delay profile.

11 Claims, 8 Drawing Sheets

RECEPTION PATH SEARCH METHOD AND SEARCHER CIRCUIT OF CDMA RECEPTION DEVICE

BACKGROUND OF THE INVENTION

The present invention relates to a reception path search method and searcher circuit for use in such method of a CDMA (Code Division Multiple Access) reception device.

Description of the Prior Art

The CDMA communication system enables communication with high quality to be implemented under very low Eb/No (signal power in every 1 bit/noise power in every 1 Hz). The CDMA communication system is used in conjunction with diversity technique using multi-path propagation (RAKE), the technique of large error-correcting code of coding gain, transmission power control technique and so forth. The CDMA communication system in conjunction with the above techniques brings such high quality communication. In recent years, the CDMA communication is applied extensively in mobile communication and so forth.

On the other hand, in the CDMA communication system, the reception signal is diffused using diffusion code. The diffused reception signal is subjected to inverse-diffusion by a diffusion code in the reception side. At the time of the inverse-diffusion of the diffused reception signal, 20 chip timing (reception timing) of the diffusion code should be accurately synchronized with the reception signal diffused by using the diffusion code indispensably. Particularly, in the case of mobile communication, there exist a great many reception paths which are changed from moment to moment. In such the case, the most appropriate reception path should be selected regularly. Reception timing of respective reception paths is necessary to be synchronized with reception signal to be followed correctly.

For instance, the Japanese Patent Application Laid-Open No. HEI 9-181704 (hereinafter referred to as a first prior art) discloses 'MULTIPATH SEARCH METHOD'. In the multipath search method, the CDMA reception device is provided with a set of search-finger and plural sets of tracking-fingers. The search-finger detects intensity level of reception signal concerning reception timing corresponding to delay range of the reception path supposed previously. The search-finger selects the most suitable plural reception paths to allocate plural reception paths to respective tracking-fingers. The tracking-finger tracks the respective reception paths in detail.

FIG. 1 is a conception view showing basic operation of the above first prior art. Its (a) indicates a reception signal. The search-finger executes correlating detection with reception signal using diffusion code in which chip timing is changed gradually with information N symbol as search range. A delay profile with reception timing shown in (b) as the horizontal axis, and with intensity level of reception signal as the vertical axis is obtained. The intensity level of the reception signal is detected in such a way that the diffusion code is multiplied by the reception signal, before executing inverse-diffusion. Subsequently, such delay profile is integrated during fixed time by integrating-dump circuit. An amplitude square circuit executes amplitude square detection.

A control means shown in (d) selects three reception paths in the example of FIG. 1, in order of the largeness of the maximum value of the delay profile. The control means allocates the chip timing to respective tracking-fingers.

The tracking-finger shown in (c) executes inverse-diffusion of the reception signal using the diffusion code of each chip timing allocated previously to generate demodulating signal. The tracking-finger compares intensity of the reception signal which is subjected to inverse-diffusion using diffusion code whose chip phase is different by only $\pm\Delta$, namely, causing the chip timing to be moved before and after, thus tracking delay variation of the reception path using DLL (Delay Lock Loop).

Furthermore, the search-finger continues search of the reception path periodically shown in (d). The reception path which is tracked by the tracking-finger overlaps with each other. When the reception path with large reception signal intensity level occurs by another cause. In such the cases, re-allocation of the reception path to the tracking-finger is implemented.

In the first prior art, the demodulating signal outputted from respective tracking-fingers are obtained above such steps. Such the demodulating signal is detected to be demodulated with phase of pilot-symbol inserted in respective time slots of reception signal as a standard, thus the output signal is obtained by the fact that RAKE-composition is executed.

It requires very large calculation quantity to obtain the delay profile while executing correlating detection with accuracy of $\frac{1}{4}$ to $\frac{1}{16}$ of the chip rate, for instance, in the above-described example, extending over wide search range such as extending over N symbols. For that reason, in the above-described first prior art, search of wide range according to the search-finger is restricted within fixed cycle. During this time interval, respective tracking-fingers monitor intensity level of the reception signal between two points with $\pm\Delta$, before executing tracking of the reception path.

Furthermore, the official report of the Japanese Patent Application Laid-Open No. HEI 10-32523 (hereinafter referred to as a second prior art) discloses the technique for obtaining the delay profile with required accuracy. According to the technique, the reception signal undergoes sampling with relatively rough sampling frequency, for instance, a sampling frequency of $\frac{1}{2}$ of the chip rate. It calculates mutual correlation between the diffusion code and, for instance, the known signal list obtained from the pilot symbol. The obtained correlation value of two samples per one chip is interpolated by an interpolation filter so that the delay profile with required accuracy is obtained.

FIG. 2 is a block diagram showing a constitution of the searcher circuit of the second prior art. The searcher circuit of FIG. 2 comprises an A/D converter 101 for converting a complex base band signal obtained from radio band signal into a digital reception signal S, a list correlator 102 for obtaining mutual correlation between the digital reception signal S and well known signal list about fixed search range in every fixed cycle, an interpolation filter 103 for re-sampling an output signal R of the list correlator 102 with four times of sampling frequency of for instance, the A/D converter 101, a power calculator 104 for obtaining power P of the mutual correlation signal which is re-executed sampling in the interpolation filter 103, an averaging part 105 for obtaining the delay profile while adding to be averaged a mutual correlation signal power P extending over plural cycles, and a peak detector 106 for determining the most suitable reception timing "τ opt" while obtaining peak "Popt" of the delay profile obtained by the averaging part 105.

The digital reception signal S is indicated as time list data of complex number with in-phase component of the complex base band signal as real number part, and with orthogonal component as imaginary number part, namely as time list data of vector value.

The list correlator 102 calculates the mutual correlation value while multiplying the time list data by complex conjugate.

For instance, the sampling frequency of the A/D converter 101 is taken as two times of the chip rate. As shown in FIG. 3, 1 time slot is constituted by transmission signal which consists of L symbols is diffused with a diffusion rate M (number of chip of diffusion code per 1 symbol) to be transmitted. On this occasion, signal component of symbol of m+1 th order in a slot of n+1 th order is diffused to the time list data from S (2LMn+2Mn+τ) to S (2LMn+2Mn+2M−1+τ) when τ is delay of reception path to the reception timing, namely known signal list Pn (i).

Consequently, from next formula, mutual correlation value Rnm (τ) with respect to symbol concerned is obtained as a vector value.

$$Rnm(\tau)=\Sigma i=0 \text{ to } M-1 S(2LMn+aMn+\tau) \times conj(Pn(j))$$

provided that conj ( ) represents complex conjugate.

Hereinafter, in the present specification, the mutual correlation value obtained by such procedure is represented as fading vector.

In the second prior art, the fading vector is obtained concerning required search range τ=τmin to τmax. For instance the in-phase-addition (addition as vector value) is executed concerning the pilot symbol of Np symbol (N=Np×M chip) which is added to the front of respective slots. The profile in which reception timing τ of fading vector Rn (τ) represented by formula below as time axis is taken as an output signal R of the list correlator 102 of the slot in order of m+1.

$$Rn(\tau)=\Sigma i=0 \text{ to } N-1 S(2LMn+2i+\tau) \times conj(Pn(i))$$

The interpolation filter 103 obtains the profile with required delay precision by interpolating the profile of two times of the sample frequency of the chip rate obtained such procedure shown in FIG. 4.

In the example of FIG. 4, 0 vector is inserted in every ⅛ chip as shown in (b) into the fading vector in every ½ chip of the profile (a) outputted by the list correlator 102. Thus, low pass filtering generates profile with accuracy of 8 times of the chip rate as shown in (c). The second prior art reduces required calculating quantity of the list correlator 102 to about ¼ thereof according to the above procedure.

According to such procedure, the delay profile of the vector value which is in-phase added in every respective slots can be obtained.

However, the reception signal S is off concerning the phase between the slots. Therefore, it is incapable of improving S/N ratio (ratio of signal per noise) while executing the in-phase-addition, such that it is implemented to the adjacent pilot symbol.

For that reason, the interpolation filter 103 outputs chip rate. The delay profile has ⅛ precision of such chip rate. The power calculator 104 obtains a power value (square sum of in-phase component and orthogonal component) of the fading vector of respective reception timing inserted of such delay profile. Subsequently, the power calculator 104 eliminates phase component. The averaging part 105 executes the power-addition, namely the averaging part 105 obtains mean value wile executing inter-slot addition of the power value of the same reception timing. The averaging part 105 outputs the delay profile which is power-added while averaging dispersion according to noise or change according to fading.

The peak detector 106 outputs one or plural reception timing "τ opt" which give the maximum value of the power added delay profile under such procedure.

As described above, in the case where the delay profile for searching the reception path of the CDMA reception device is obtained, in the conventional method, the fading vector is in-phase added with respect to fixed time interval when it can be thought that the phase of the reception complex base band signal does not change in large scale, for instance concretely, in the above second prior art, the fading vector is in-phase-added concerning the pilot signal of Np symbol added to the front of respective slots. The prior art procedure obtains the delay profile of the vector value, before executing the power-addition extending over appropriate cycle to obtain required delay profile.

When change of transmission line of the reception path in between a plurality of delay profiles, namely radio band signal, is small, the suitable S/N ratio can be obtained using the in-phase-addition rather than the power-addition. However, in a practical manner, propagation characteristic of the transmission line changes from moment to moment.

When the phase of the reception complex base band signal is changed according to change of the propagation characteristic of the transmission line, the phase of the fading vector is changed according thereto. In such the case, if the in-phase-addition continues, it is incapable of obtaining effective delay profile, since the meaningful signal component is cancelled caused by the vector-addition.

Consequently, the conventional technique executes the in-phase-addition of the fading vector during fixed time interval uniformly to obtain the delay profile vector added, before power adding it to obtain the delay profile. Therefore, the conventional method has the problem that in the case where condition of the transmission line is changed largely as the mobile communication, it is not always obtained the effective delay profile.

SUMMARY OF THE INVENTION

In view of the foregoing, it is an object of the present invention, in order to overcome the above mentioned problem, to provide a reception path search method and a searcher circuit for use in such method of a CDMA reception device which monitors change of phase angle of fading vector to judge propriety of continuity of the in-phase-addition. The reception path search method and a searcher circuit for use in such method of the CDMA reception device controls number of the in-phase-addition appropriately to obtain effective delay profile whose S/N ratio is suitable.

According to a first aspect of the present invention, in order to achieve the above-mentioned object, there is provided a reception path search method of a reception device of CDMA (Code Division Multiple Access) communication system which comprises the steps of: generating a delay profile in every fixed cycle while executing plot of fading vector which is obtained in such a way that a reception signal converted into a complex base band signal is subjected to inverse-diffusion with known signal list in every reception timing about fixed range, generating an in-phase added delay profile while continuing vector-addition of the fading vector in every reception timing concerning continuous delay profile generated in every fixed cycle described above generating a power added delay profile while continuing the power-addition in every reception timing regarding fading vector with respect to continuous in-phase added delay profile, and searching an appropriate reception path while referring to the power added delay profile, wherein number of continuation of the vector-addition is taken to be variable, the reception path search method monitors a change of phase angle of the complex base band signal which change is reflected to respective delay profiles generated in every the fixed cycle, in the case where such phase angle is changed largely from settled angle of a threshold value, the reception path search method discontinues the continuation of the vector-addition, and then delay profiles which are in-phase added up to that time are taken as an object of the power-addition, before generating delay profile which is subjected to the power-addition.

According to a second aspect of the present invention, there is provided a reception path search method of a reception device of CDMA (Code Division Multiple Access) communication system which comprises the steps of: a delay profile generating step for generating a delay profile in every fixed cycle in such a way that the reception path search method causes fading vector to be plotted in every reception timing in connection with a fixed range, such fading vector is obtained in such a way that reception signal converted into complex base band signal undergoes inverse-diffusion using known signal list, a fading vector averaging step for calculating fading vector which is subjected to weighted-averaging such that the reception path search method selects maximum value of prescribed number more than one in order of the largeness from among the fading vector plotted in every reception timing in connection with respective these delay profiles, before executing weighted-averaging, a rotational comparison step for comparing an absolute value of an angle difference between a phase angle of the fading vector which is subjected to weighted-averaging and a phase angle of a basic vector maintained separately with an angle of a threshold value determined beforehand, before replacing the basic vector with the fading vector which is subjected to weighted-averaging when the absolute value of the angle difference is larger than the angle of threshold value, an in-phase-addition step for updating a delay profile which is subjected to the in-phase-addition in such away that when the absolute value of the angle difference is judged the angle difference is not larger than the angle of threshold value in such the rotational comparison step, the fading vector of the delay profile providing the fading vector which is subjected to weighted-averaging is executed a vector-addition in every reception timing to a fading vector of the delay profile which is subjected to the in-phase-addition maintained separately, while when the absolute value of the angle difference is judged the angle difference is larger than the angle of threshold value in such the rotational comparison step, the in-phase-addition step outputs the delay profile which is subjected to the in-phase-addition, as well as the in-phase-addition step updates the delay profile which is subjected to the in-phase-addition while replacing it with the delay profile providing the fading vector which is subjected to weighted-averaging, a power-addition step for calculating to be maintained delay profile which is subjected to the power-addition in such a way that the power-addition step executes cumulative addition of a power value of fading vector in every reception timing of the delay profile which is subjected to the in-phase-addition which is outputted in the in-phase-addition step, a delay profile outputting step for outputting delay profile which is subjected to the power-addition which is calculated to be maintained in the power-addition step whenever the number of times of generation of delay profile generated in every fixed cycle in the delay profile generating step comes to the number of times determined beforehand, and a reception path selecting step for selecting the most suitable reception timing of one or a plural number based on the delay profile outputted in the delay profile outputting step, before outputting as a reception path.

According to a third aspect of the present invention, in the second aspect, there is provided a reception path search method, wherein when the rotational comparison step judges that the absolute value of the angle difference is not larger than the angle of threshold value, the rotational comparison step does not execute updating of the basic vector.

According to a fourth aspect of the present invention, in the second aspect, there is provided a reception path search method, wherein when the rotational comparison step judges that the absolute value of the angle difference is not larger than the angle of threshold value, the rotational comparison step updates the basic vector, while executing vector-addition such that the rotational comparison step executes vector-addition between the fading vector which is subjected to weighted-averaging and the basic vector.

According to a fifth aspect of the present invention, in the second aspect, there is provided a reception path search method, wherein in the cases where the delay profile outputting step outputs the delay profile which is subjected to the power-addition, the delay profile which is subjected to the in-phase-addition in the in-phase-addition step is maintained on that occasion, in such the case, the delay profile outputting step executes the power-addition between the delay profile which is subjected to the in-phase-addition and the delay profile which is subjected to the power-addition, before outputting, and the delay profile outputting step clears the maintained delay profile which is subjected to the power-addition.

According to a sixth aspect of the present invention, in the second aspect, there is provided a reception path search method, wherein when the power-addition step executes cumulative addition in every reception timing in connection with power value of the fading vector in every reception timing of the delay profile which is subjected to the in-phase-addition in the in-phase-addition step, the power-addition step executes appropriate weighting cumulative addition in consideration of number of the in-phase-addition in the in-phase-addition step of the delay profile which is subjected to the in-phase-addition.

According to a seventh aspect of the present invention, there is provided a searcher circuit of CDMA (Code Division Multiple Access) communication system which comprises a delay profile generator for generating delay profile in every fixed cycle while plotting a fading vector which is obtained in such a way that a reception signal converted into a complex base band signal is subjected to inverse-diffusion using known signal list in every reception timing in relation to fixed range, a fading vector averaging part for calculating a fading vector which is subjected to weighted-averaging in such a way that the fading vector averaging part selects maximum number of prescribed number more than one in order of the largeness thereof from among the fading vector plotted in every reception timing in connection with respective delay profiles, a basic vector maintaining part for maintaining a basic vector, a rotational comparator for comparing an absolute value of an angle difference between a phase angle of the fading vector which is subjected to weighted-averaging and a phase angle of the basic vector with an angle of threshold value determined beforehand, and replacing the basic vector with the fading vector which is subjected to weighted-averaging when the absolute value of the angle difference is larger than the angle of threshold value, an in-phase adder for updating a delay profile which is subjected to the in-phase-addition in such a way that the in-phase adder executes vector-addition between a fading vector of the delay profile generated by the delay profile generator and a fading vector of a maintained delay profile which is subjected to the in-phase-addition in every reception timing, when such control is executed, the in-phase adder outputs the delay profile which is subjected to the in-phase-addition, and the in-phase adder replaces to be updated the delay profile which is subjected to the in-phase-addition by the delay profile generated by the delay profile generator, a power adder for calculating to be maintained a delay profile which is subjected to the power-addition in such a way that the power adder executes cumulative addition of power value of fading vector of every reception timing of the delay profile which is subjected to the in-phase-addition outputted from the in-phase adder in every reception timing, a controller for controlling the in-phase adder so as to output the delay profile which is subjected to the in-phase-addition, and so as to replace to be updated the delay profile which is subjected to the in-phase-addition by the delay profile generated by the delay profile generator when the controller judges that the absolute value of the angle difference between the phase angle of the fading vector which is subjected to weighted-averaging at the rotational comparator and phase angle of the basic vector is larger than the angle of threshold value, and for controlling the power adder so as to output a delay profile which is subjected to the power-addition which is calculated to be maintained in the power adder whenever the number of times of generation of a delay profile generated in every fixed cycle in the delay profile generator comes to the number of times determined beforehand.

According to an eighth aspect of the present invention, in the seventh aspect, there is provided a searcher circuit of CDMA (Code Division Multiple Access) communication system, wherein the rotational comparator does not update the basic vector when it is judged that the absolute value of the angle difference is not larger than the angle of threshold value.

According to a ninth aspect of the present invention, in the seventh aspect, there is provided a searcher circuit of CDMA (Code Division Multiple Access) communication system, wherein the rotational comparator updates the basic vector while executing vector-addition between the fading vector which is subjected to weighted-averaging and the basic vector when it is judged that the absolute value of the angle difference is not larger than the angle of threshold value.

According to a tenth aspect of the present invention, in the seventh aspect, there is provided a searcher circuit of CDMA (Code Division Multiple Access) communication system, wherein when the controller causes the power adder to be controlled so as to output the delay profile which is subjected to the power-addition, on this occasion, if the delay profile which is subjected to the in-phase-addition is maintained, the controller executes the power-addition between the delay profile which is subjected to the in-phase-addition and the delay profile which is subjected to the power-addition before outputting it and the controller controls the power adder so as to clear the maintained delay profile which is subjected to the power-addition.

According to an eleventh aspect of the present invention, in the seventh aspect, there is provided a searcher circuit of CDMA (Code Division Multiple Access) communication system, wherein when the power adder executes appropriate weighting cumulative addition in consideration of the number of times of the in-phase-addition in the in-phase adder of the delay profile which is subjected to the in-phase-addition, the power adder executes cumulative addition of power value of the fading vector of every reception timing of the delay profile which is subjected to the in-phase-addition outputted from the in-phase adder in every reception timing.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will be described in detail in accordance with the accompanying drawings.

Figure 1:
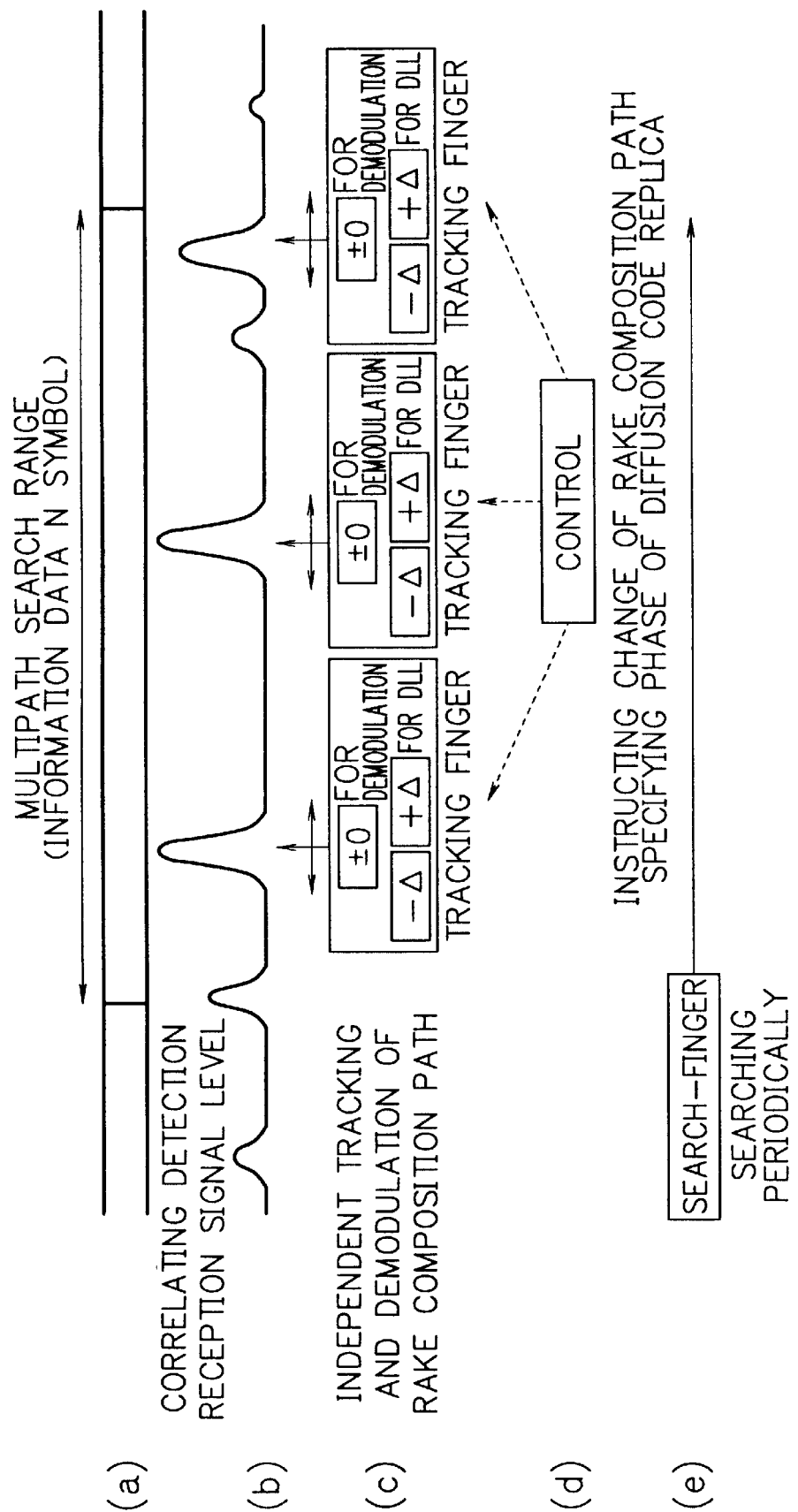
FIG. 1 is a conception view showing fundamental operation of a first prior art.
Figure 2:
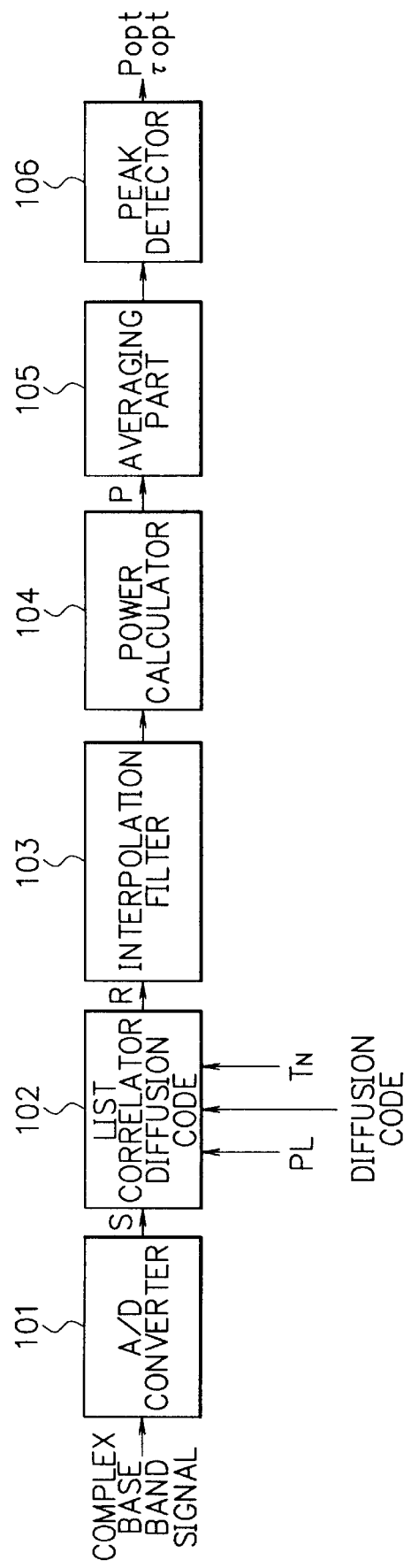
FIG. 2 is a block diagram showing constitution of a searcher circuit of a second prior art.
Figure 3:
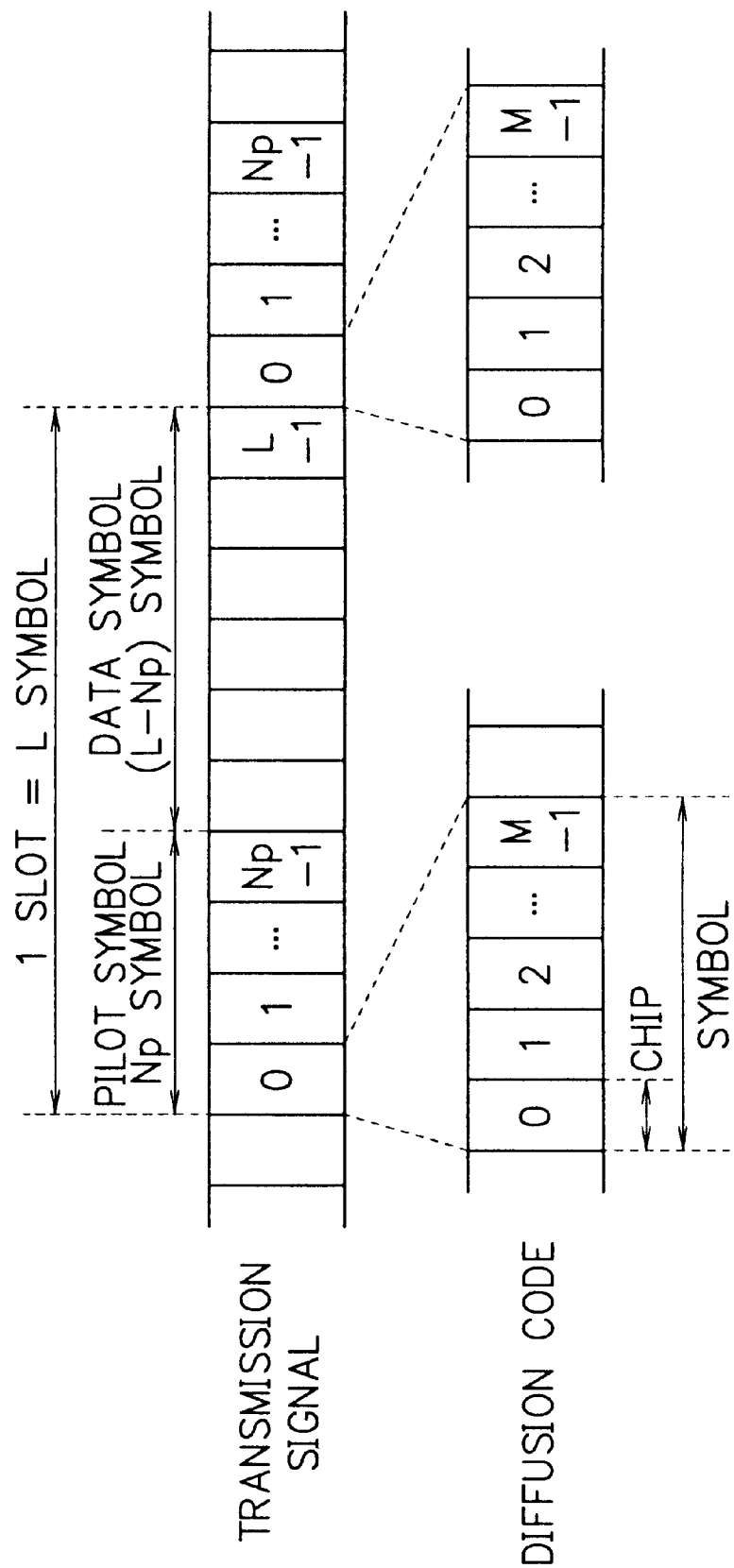
FIG. 3 is a format view showing a constitution example of transmission signal of a CDMA communication method.
Figure 4:
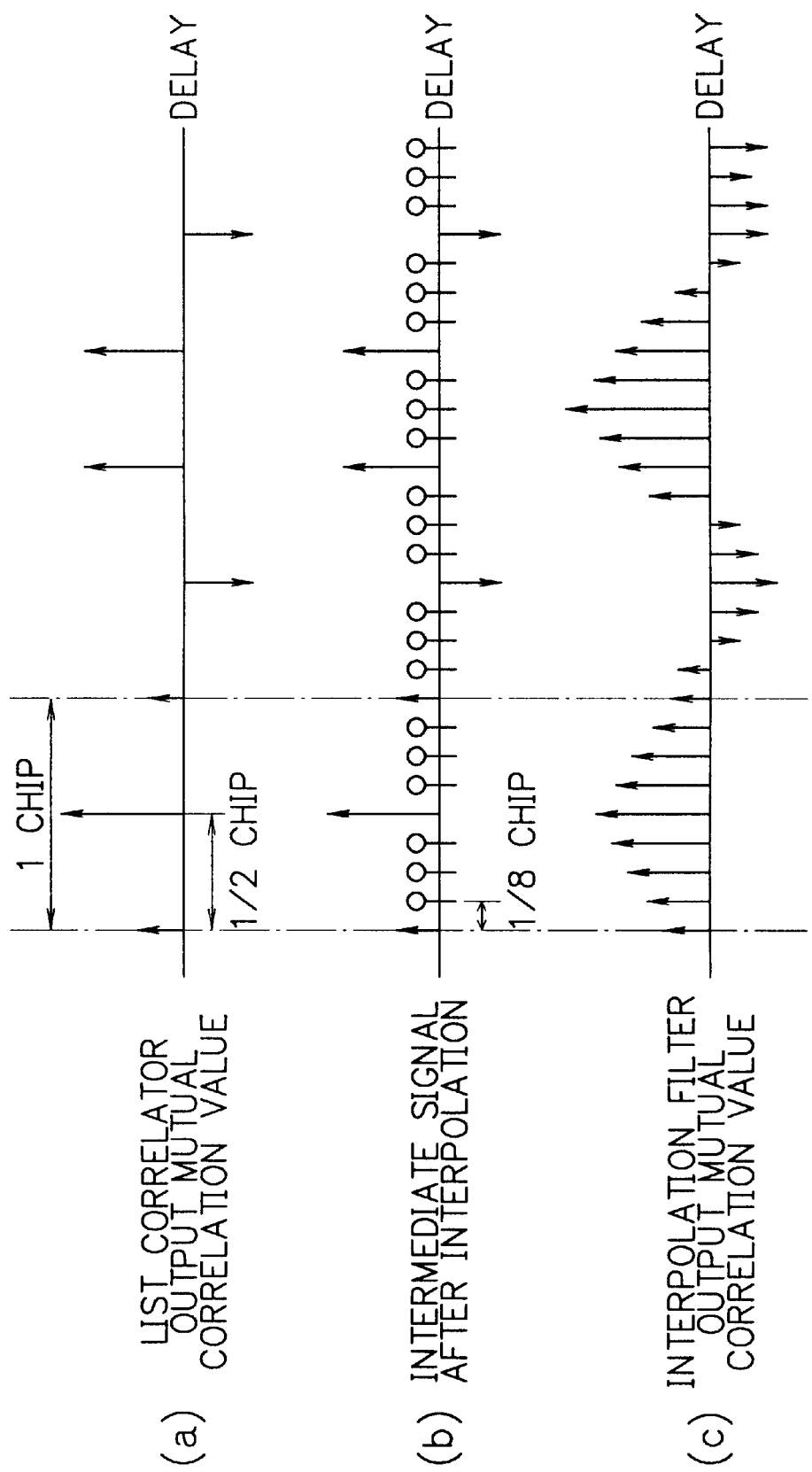
FIG. 4 is a graph view showing operation of an interpolation filter of FIG. 2.
Figure 5:
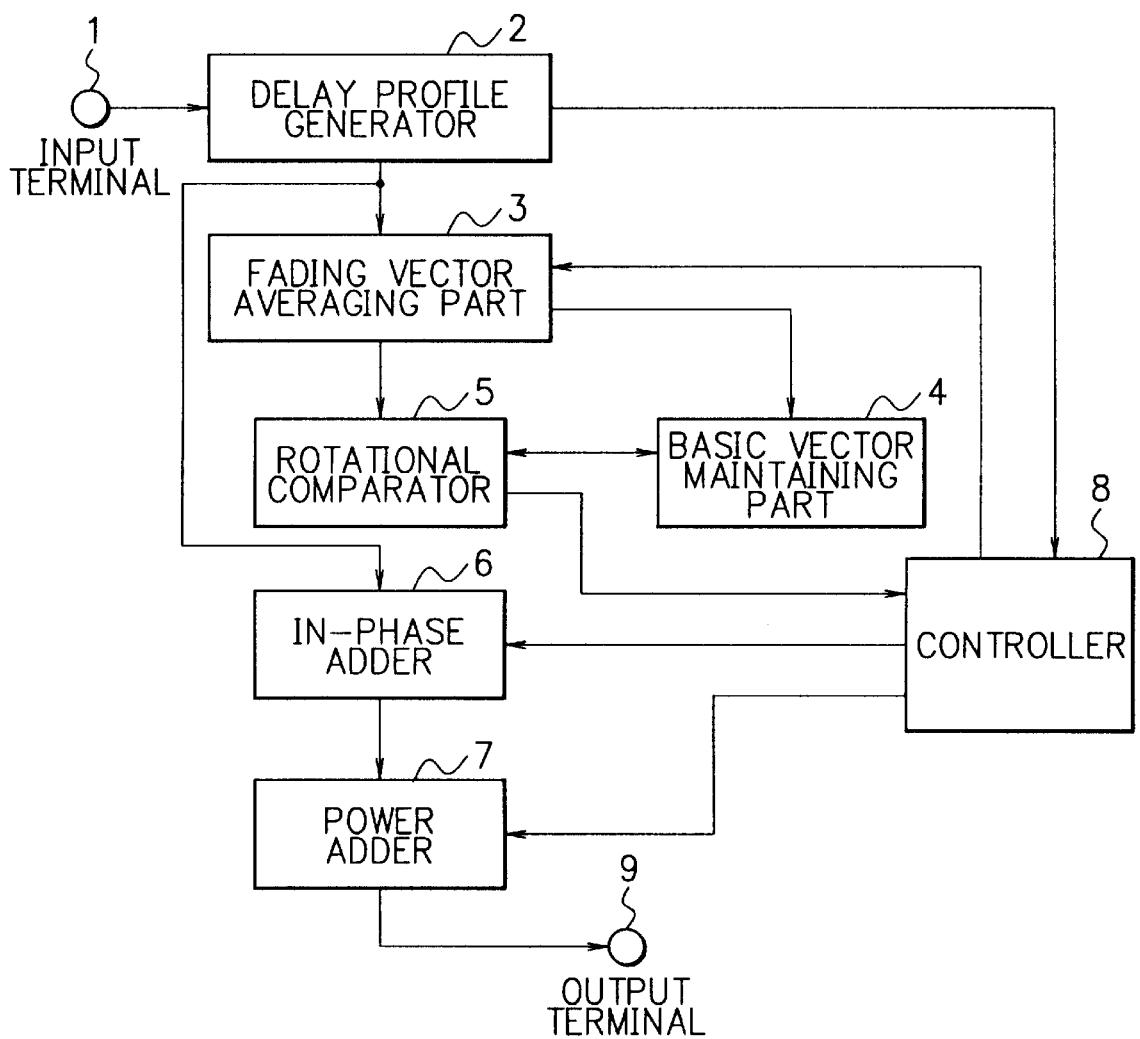
FIG. 5 is a functional block diagram showing a searcher circuit of the CDMA reception device according to one embodiment of the present invention.

FIG. 5 is a functional block diagram showing a searcher circuit of the CDMA reception device according to one embodiment of the present invention. The searcher circuit of the CDMA reception device comprises a delay profile generator 2, fading vector averaging part 3, a basic vector maintaining part 4, a rotational comparator 5, an in-phase adder 6, a power adder 7, and a controller 8.

The delay profile generator 2 inputs therein a digitized complex base band signal from an input terminal 1. The delay profile generator executes inverse-diffusion to the digitized complex base band signal. The delay profile generator obtains fading vector in every reception timing. The fading vector has required accuracy. The fading vector is obtained with respect to required search range. The delay profile generator 2 generates to be outputted a delay profile of a vector value in every appropriate cycle, for instance, in every symbol cycle.

The fading vector averaging part 3 selects N maximum values in order of largeness thereof from among the fading vectors obtained by the delay profile generator 2 in accordance with integer number N more than 1 specified by the controller 8. The fading vector averaging part 3 obtains weighted vector mean of respective N fading vectors using weighting factor (scalar value) specified respectively.

The rotational comparator 5 obtains angle difference "θd". A phase of the fading vector which undergoes weighted vector averaging is calculated by the fading vector averaging part 3. A phase of the basic vector which is maintained in the basic vector maintaining part 4 is compared with the above phase of the fading vector. The angle difference "θd" is an angle difference between the phase of the fading vector and the phase of the basic vector. The rotational comparator 5 compares an absolute value of the angle difference "θd" with a threshold value "θth" which is specified for the sake of the controller 8. The rotational comparator 5 notices comparison result thereof to the controller 8. When the absolute value of the angle difference "θd" is larger than the threshold value "θth", the rotational comparator 5 replaces the basic vector maintained in the basic vector maintaining part 4 with the fading vector which is subjected to weighted vector averaging in the fading vector averaging part 3.

The in-phase adder 6 generates to be maintained a delay profile of vector value which is subjected to the in-phase-addition. The fading vector of the delay profile of the vector value which is generated by the delay profile generator 2 is executed the in-phase-addition in every respective reception timing.

The power adder 7 obtains a power value (square sum of in-phase component and orthogonal component) of the fading vector of the delay profile of the vector value in every reception timing. The in-phase adder 6 outputs the delay profile of the vector value which undergoes the in-phase-addition. The power value of the fading vector is added to a maintained power value of every reception timing of the delay profile which is subjected to the power-addition. According to this addition of power value, the power adder 7 updates delay profile which is subjected to the power-addition.

The controller 8 controls respective parts as follows:

The controller 8 specifies number "N" of the maximum value of the fading vector to be selected to the fading vector averaging part 3.

The fading vector averaging part 3 calculates the fading vector which is subjected to the weighted vector averaging. The phase of the basic vector is maintained at the basic vector maintaining part 4. The rotational comparator 5 compares a phase of the fading vector with the phase of the basic vector to calculate an angle difference "θd". When an absolute value of the angle difference "θd" becomes larger than a threshold value "θth", the controller 8 outputs the delay profile which is in-phase added, and which is added to be maintained in the in-phase adder 6 to the power adder 7. Further, the controller 8 controls in-phase adder 6 so as to replace the delay profile which is in-phase added, and which is added to be maintained in the in-phase adder 6 with a delay profile generated by the delay profile generator 2.

The total number of the delay profile which is generated by the delay profile generator 2 comes to a threshold value "M-th" determined beforehand. The controller 8 outputs the delay profile which is power added, and which is maintained at the power adder 7, to an output terminal 9, in every case where the total number of the delay profile which is generated by the delay profile generator 2 comes to a threshold value "M-th" determined beforehand. Subsequently, the controller 8 controls the power adder 7 so as to clear it. On this occasion, when the in-phase adder 6 maintains the delay profile which is in-phase added, the controller 8 controls the in-phase adder 6 so as to output the delay profile which is in-phase added, and which is added to be maintained, to the power adder 7. The controller 8 executes the power-addition of the delay profile which is in-phase added, which is outputted from the in-phase adder 6, before, the controller 8 controls the power adder 7 so as to output the delay profile which is power added.

Figure 6:
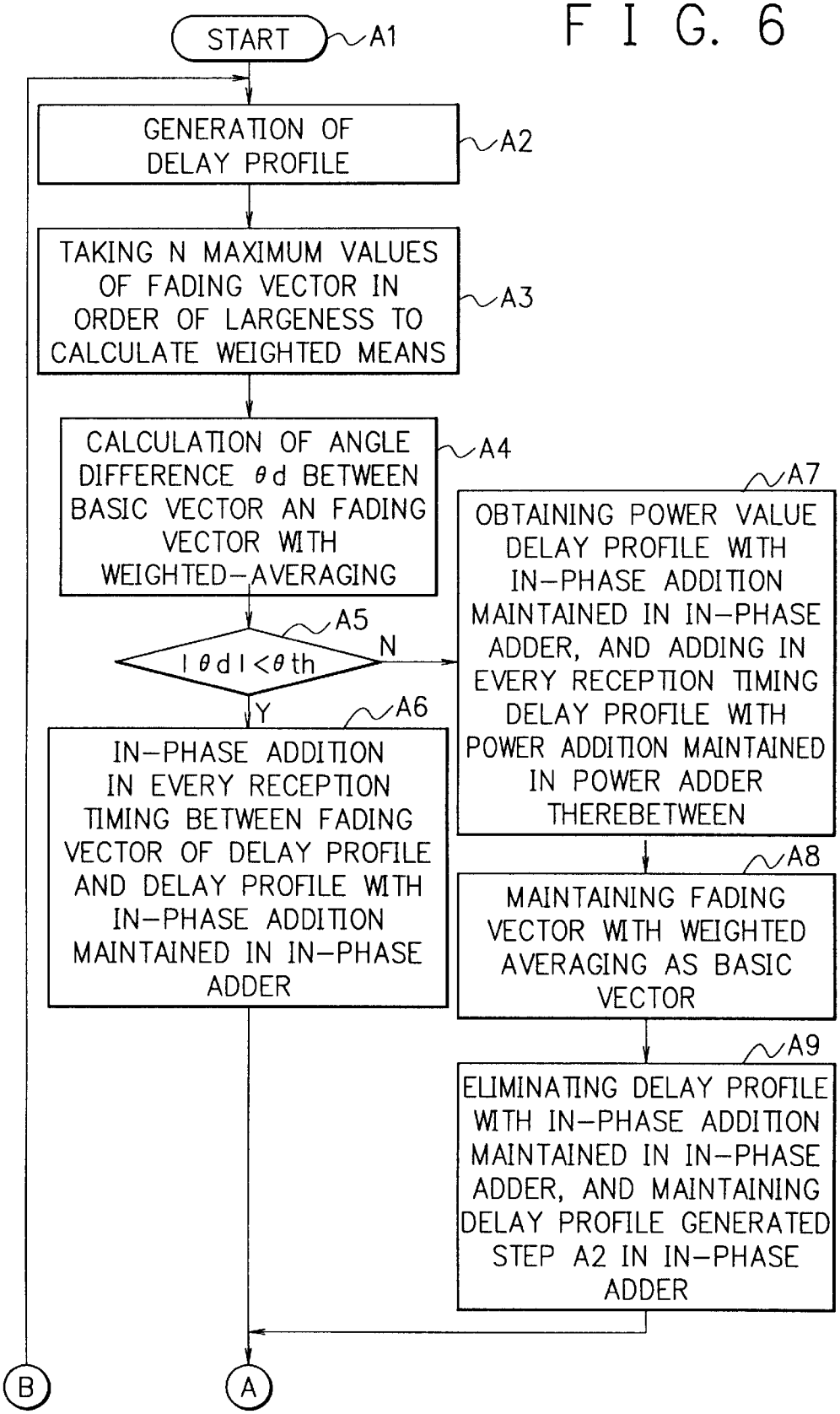
FIG. 6 is a flowchart explaining a first half of control flow of the searcher circuit of FIG. 5.
Figure 7:
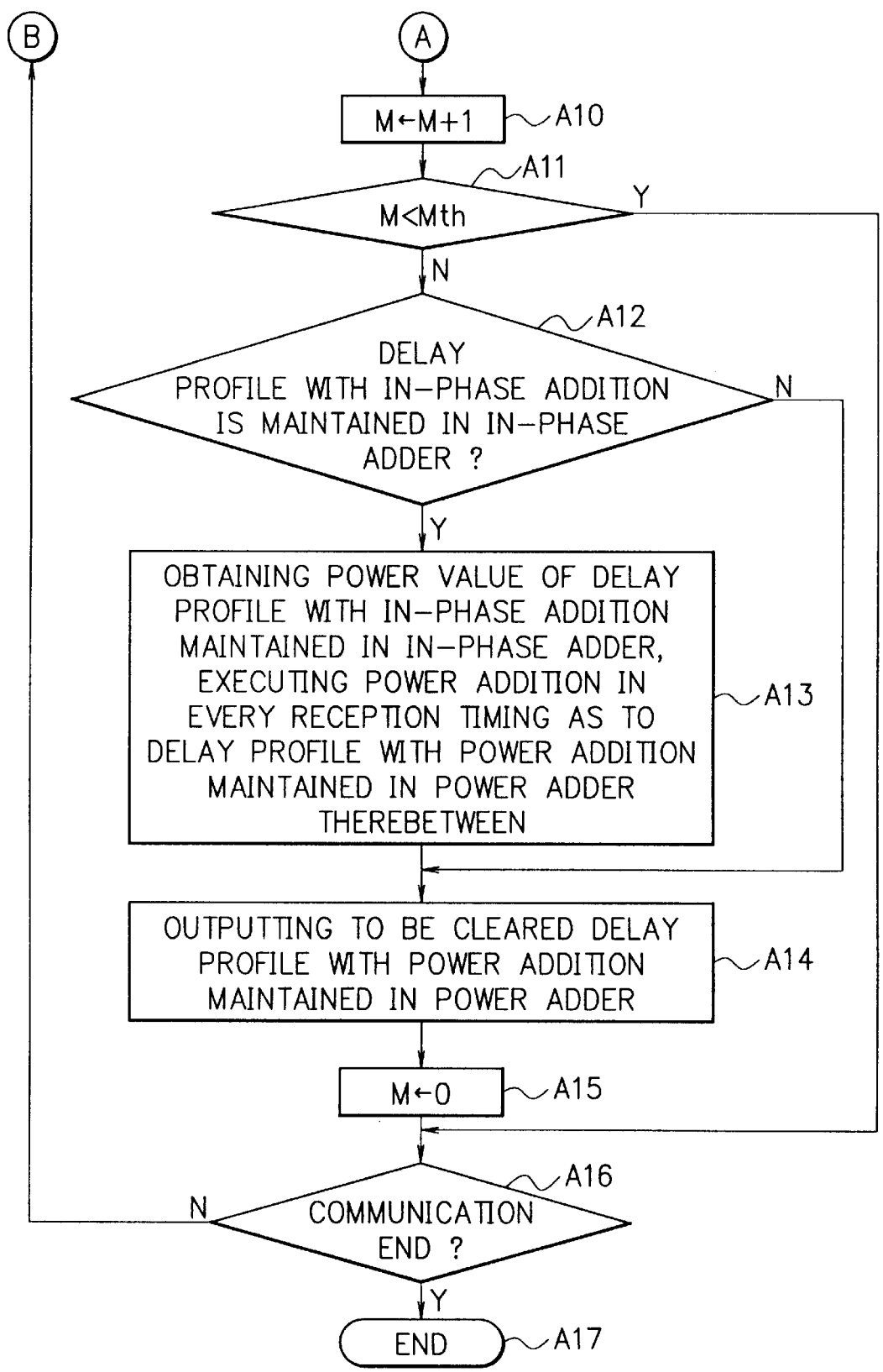
FIG. 7 is a flowchart explaining a second half of control flow of the searcher circuit of FIG. 5.

FIGS. 6 and 7 are flowcharts for explaining control flow of the searcher circuit of FIG. 5. Hereinafter, there will be described operation of the searcher circuit of the CDMA reception device according to the present embodiment referring to FIGS. 6 and 7.

The delay profile generator 2 inputs therein digitized complex base band signal inputted from the input terminal 1. The delay profile generator 2 executes inverse-diffusion of the complex base band signal in the well known signal list according to the means described in the list correlator of the second prior art or according to the appropriate known means. Subsequently, the delay profile generator 2 obtains the fading vector in every reception timing with required accuracy concerning required search range. The delay profile generator 2 generates to be outputted the delay profile of the vector value in every appropriate cycle, for instance, in every symbol cycle (STEP A2).

The controller 8 controls the fading vector averaging part 3. The delay profile generator 2 outputs the delay profile of the vector value under the control of the controller 8. The fading vector averaging part 3 selects N maximum values in order of largeness of the fading vectors. The fading vector averaging part 3 executes weighted-averaging, before calculating the fading vector which is weighted to be averaged (STEP A3).

Next, the rotational comparator 5 obtains angle difference θd between the phase of the fading vector and the phase of basic vector. The fading vector is subjected to weighted-averaging. The basic vector is maintained in the basic vector maintaining part 4. The phase of the fading vector is compared with the phase of the basic vector to obtain the angle difference "θd" (STEP A4). The rotational comparator 5 compares an absolute value of the angle difference "θd" with the threshold value "θth" to be specified for the sake of the controller 8 (STEP A5).

The absolute value of the angle difference "θd" is larger than the threshold value "θth". In such the case, the controller 8 controls the in-phase adder 6 so as to update the maintained delay profile which is subjected to the in-phase-addition. The delay profile of the vector value is obtained in STEP A2. The other in-phase added delay profile is maintained in the in-phase adder 6. The delay profile of the vector value is in-phase added to the other in-phase added delay profile in every reception timing. In such the in-phase-addition, the controller 8 causes the in-phase adder 6 to be controlled so as to update the maintained delay profile which is subjected to the in-phase-addition (STEP A6).

On the other hand, in STEP AS, the absolute value of the angle difference "θd" is already larger than the threshold value "θth", on this occasion, phase variation of reception complex base band signal is large, thus it is incapable of improving S/N ratio by the in-phase-addition. Therefore, the controller 8 obtains a power value of the fading vector in every respective reception timing in terms of the delay profile which is in-phase added until then, and which is maintained in the in-phase adder 6. The delay profile which is subjected to the power-addition is maintained in the power adder 7. The power value of the fading vector is added to the delay profile with the power-addition in every respective reception timing. Thus, the controller 8 controls the power adder 7 so as to update the delay profile which is power added according to addition between the power value of the fading vector and the power added delay profile (STEP A7).

Furthermore, the fading vector with weighted-averaging calculated in STEP A3 is taken as a new basic vector, before being stored in the basic vector maintaining part 4 (STEP A8). Simultaneously, the controller 8 eliminates the in-phase added delay profile which is maintained in the in-phase adder 6. Subsequently, the controller 8 causes the delay profile generated in STEP A2 to be maintained newly in the in-phase adder 6.

Figure 8:
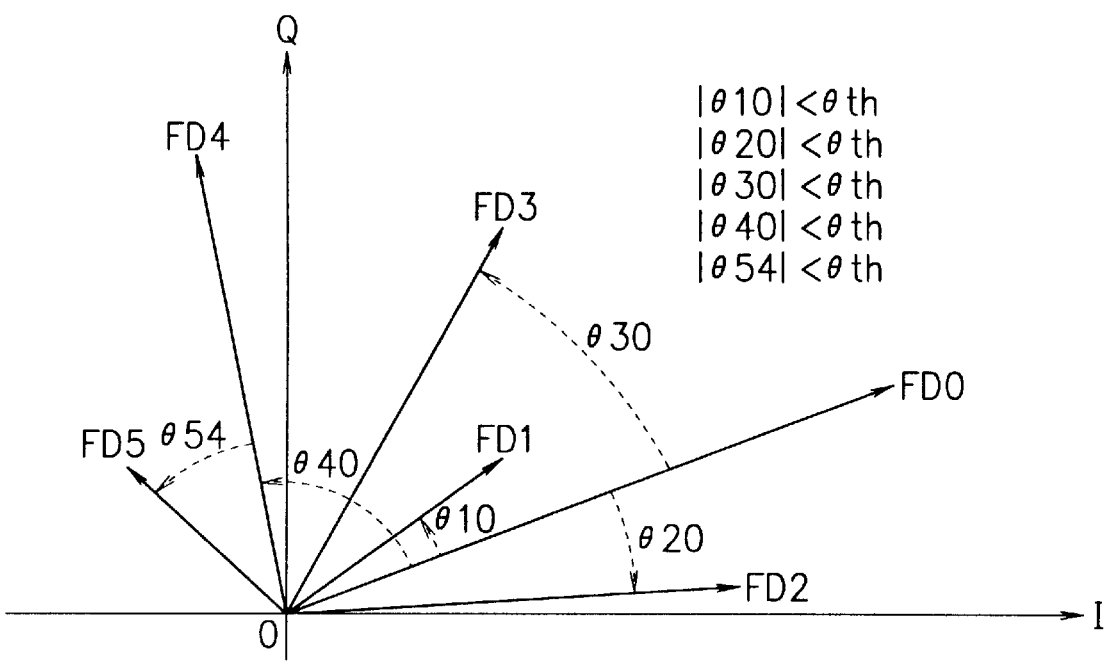
FIG. 8 is a conception view showing concrete example of control in steps A4, A5, and A8 of FIG. 6.

FIG. 8 is a conception view for explaining one example of control of control flow described-above.

The delay profile generator 2 generates delay profiles D0, to D5 (not illustrated) in order. FD0 to FD5 shown in FIG. 8 are fading vectors calculated from delay profiles D0 to D5 by the fading vector generator 2. The FD0 to FD5 are fading vector with the weighted-averaging. The fading vector FD0 is stored in the basic vector maintaining part 4 as a basic vector. Subsequently, the fading vectors with the weighted-averaging FD1, FD2, FD3, FD4, and FD5 generated in order. FIG. 8 shows the state of affairs.

The fading vector with weighted-averaging FD1 is generated together with the basic vector FD0. An absolute value of angle difference "θ10" of the fading vector with weighted-averaging FD1 is compared with the threshold value "θth" in the rotational comparator 5. In the result of comparison, since relation between the absolute value of angle difference "θ10" of the fading vector with weighted-averaging FD1 and the threshold value "θth" is |θ10|<θth, the delay profile D1 which is obtained in STEP A2 is in-phase added to the in-phase added delay profile (D0 in this case) which is maintained in the in-phase adder.

An angle difference between the basic vector FD0 and the fading vector with weighted-averaging FD2 and an angle difference between the basic vector FD0 and the fading vector with weighted-averaging FD3 whose respective absolute values are smaller than threshold value "θth" are "θ20", and "θ30" respectively as shown in FIG. 8. Absolute values of "θ20", and "θ30" are smaller than the threshold value "θth". The delay profiles D2, and D3 corresponding to the absolute values of "θ20", and "θ30" are in-phase added to the in-phase added delay profiles which are maintained in the in-phase adder 6.

However, an angle difference between the basic vector FD0 and the fading vector with weighted-averaging FD4 whose absolute values is larger than threshold value "θth" is "θ40". Therefore, the in-phase added delay profile maintained in the in-phase adder 6 until that time is inputted to the power adder 7. Such the in-phase added delay profile is power added to the power added delay profile which is maintained therein.

The in-phase added delay profile which is maintained in the in-phase adder 6 is eliminated. A delay profile D4 generated this time is maintained in the in-phase adder 6 newly as an in-phase added delay profile.

Further, the fading vector FD4 with weighted-averaging is stored in the basic vector maintaining part 4 as a new basic vector.

A delay profile D5 is generated secondly. A fading vector FD5 with weighted-averaging is obtained from the delay profile D5. The fading vector with weighted-averaging FD5 is compared with the basic vector FD4. When an absolute value of an angle difference θ54 is smaller than the threshold value θth, the delay profile D5 is in-phase added to the delay profile D4 which is maintained in the in-phase adder 6.

Returning to flowchart of FIG. 6, the in-phase-addition of the delay profile in STEP A6 ends. Replacement of the in-phase added delay profile in STEP A9 ends. On that occasion, both control flows shift to STEP A10 of FIG. 7. The controller 8 increases an in-phase-addition counter M by 1. The controller 8 compares the in-phase-addition counter M with a threshold value M th determined beforehand (STEP A11).

When the in-phase-addition counter M is smaller than the threshold value M th, the control flow shifts to STEP A16. The controller 8 judges whether or not communication ends.

If the communication ends, the controller 8 ends processing (STEP A17). If the communication is in continuity, the control flow returns to STEP A2. Then new delay profile is generated.

In STEP A11, when the in-phase counter M comes to the threshold value M th, a check is implemented whether or not the in-phase added delay profile is maintained in the in-phase adder 6. Namely a check is implemented whether or not the in-phase added delay profile in STEP A9 is just replaced (STEP A12).

The delay profile with the in-phase-addition is maintained in the in-phase adder 6. On this occasion, power value of the in-phase added delay profile which is maintained is obtained. The power value of the delay profile is power added to the power added delay profile which is maintained in the power adder 7 until that time in every reception timing (STEP A13). The power added delay profile is outputted to an output terminal 9 (STEP A14).

Furthermore, when the in-phase added delay profile is not maintained in the in-phase adder 6, the control flow shifts from STEP A12 to STEP A14 directly. The power added delay profile maintained in the power adder 7 until that time is outputted as it is.

In STEP A14, the power added delay profile is outputted, before the in-phase-addition counter M is reset to 0. The control flow shifts from STEP A14 to STEP A16. The controller 8 judges whether or not the communication ends. When communication ends, the controller 8 ends processing (STEP A17). While when the communication is in continuity, the control flow returns to STEP A2. Thus, new delay profile is generated.

As described above, in the reception path-search method of the CDMA receiver according to the present embodiment. On the occasion of generation of the delay profile a method which is different from the conventional method is proposed. In the conventional method, the fading vector is in-phase added during fixed period uniformly. Subsequently, the delay profile which is subjected to vector-addition is obtained. The vector added delay profile is power added to calculate delay profile. In stead of the above conventional method, the proposed reception path-search method is as follows. The angle difference of the fading vector which is subjected to the weighted-averaging is observed. If the angle difference is within the fixed threshold value, the in-phase-addition continues. When the angle difference becomes more than the threshold value, the power-addition is started while switching the in-phase-addition. Therefore, it is capable of controlling number of the in-phase-addition appropriately, in answer to change of the transmission line. It is capable of generating delay profile whose S/N ratio is high, and which delay profile is significant.

One embodiment of the present invention has been described referring to FIGS. 5 to 8. However, the present invention is not restricted by this embodiment. Various kinds of practical applications are conceivable.

For instance, the rotational comparator 5 compares the phase of the fading vector which is subjected to weighted vector averaging with the phase of the basic vector maintained in the basic vector maintaining part 4 to obtain the angle difference θd therebetween. Only when the absolute value of the angle difference θd is larger than the threshold value θth, the rotational comparator 5 replaces the basic vector with the fading vector which is subjected to weighted vector averaging. The basic vector is maintained in the basic vector maintaining part 4, and the fading vector undergoes weighted vector averaging in the fading vector averaging part 3. However, there is a case where the absolute value of the angle difference θd is smaller than the threshold value θth, the in-phase-addition of the delay profile generated in the delay profile generator 2 continues in the in-phase adder 6. It is suitable that the rotational comparator updates the basic vector in such a way that the fading vector which is subjected to weighted vector averaging is vector-added to the basic vector maintained in the basic vector maintaining part 4.

According to this method, it is capable of obtaining more appropriate phase angle of the basic vector while compensating instantaneous variation within the threshold value θth of phase of the reception complex base band signal. It is capable of executing switchover of the in-phase-addition and the power-addition of delay profile which reflects state variation of reception path more accurately.

Furthermore, in the above embodiment, the in-phase adder 6 outputs the in-phase added delay profile. The power adder 7 obtains power value of the fading vector of the in-phase added delay profile in every reception timing. The power adder 7 obtains the in-phase added delay profile while adding power value of the fading vector in its entirely to the power value in every reception timing of the power added delay profile maintained.

According to this operation, the in-phase added delay profile which is outputted from the in-phase adder 6 is power-added with weighting of a square of the number of the in-phase-addition. Therefore, it is capable of obtaining the power added delay profile which reflects number of continuity of the in-phase-addition more strongly, namely which reflects stable state of the reception path. However, another weighting addition is also suitable. For instance, the power value of the fading vector in every reception timing of the in-phase added delay profile is divided by number of the in-phase-addition to obtain the value. The value divided is added to the power value in every reception timing of the power added delay profile maintained.

As described-above, according to the present invention, in the searcher circuit of the present invention, it causes the in-phase-addition of the delay profile and the number of the power-addition to be variable. The rotational comparator 5 obtains the angle difference between the basic vector and the fading vector which is subjected to weighted-averaging. When the absolute value of the angle difference is smaller than the threshold value determined beforehand, angle variation of the phase angle of the reception complex base band signal is small. Therefore, it is judged that it is capable of improving S/N ratio of the delay profile effectively by virtue of the in-phase-addition to continue the in-phase-addition. While, when the absolute value of the angle difference is larger than the threshold value, it is judged that the power-addition is capable of improving S/N ratio rather than the in-phase-addition. The in-phase-addition is switched to the power-addition.

Consequently, according to the present invention, it is capable of switching addition method between the in-phase-addition and the power-addition in answer to the state change of the reception path. The delay profile which reflects the state change of the reception path more accurately, whose S/N ratio is high, and which is significant can be obtained.

While preferred embodiments of the invention have been described using specific terms, such description is for illustrative purposes only, and it is to be understood that changes and variations may be made without departing from the spirit or scope of the following claims.

What is claimed is:

1. A reception path search method of a reception device of CDMA (Code Division Multiple Access) communication system comprising the steps of:

generating a continuous delay profile in every fixed cycle while plotting a fading vector which is obtained in such a way that a reception signal converted into a complex base band signal is subjected to inverse-diffusion using a known signal list in every reception timing about a fixed range;

generating an in-phase added delay profile which is subjected to in-phase-addition while continuing vector-addition of the fading vector in every said reception timing in connection with the continuous delay profile generated in every said fixed cycle;

generating a power added delay profile which is subjected to power-addition while continuing the power-addition of the fading vector in every said reception timing with respect to the continuous delay profile which is subjected to the in-phase-addition; and searching an appropriate reception path while referring to said power added delay profile, wherein number of continuation of said vector-addition is taken to be variable, said reception path search method monitors a change of phase angle of said complex base band signal which change is reflected to respective delay profiles generated in every said fixed cycle, in the case where such phase angle is changed largely from settled angle of a threshold value, said reception path search method discontinues said continuation of the vector-addition, and then delay profiles which are in-phase added up to that time are taken as an object of the power-addition, before generating delay profile which is subjected to said power-addition.

2. A reception path search method of a reception device of CDMA (Code Division Multiple Access) communication system comprising the steps of:

a delay profile generating step for generating a delay profile in every fixed cycle in such a way that said reception path search method causes fading vector to be plotted in every reception timing in connection with a fixed range, such fading vector is obtained in such a way that reception signal converted into complex base band signal undergoes inverse-diffusion using known signal list;

a fading vector averaging step for calculating fading vector which is subjected to a weighted-averaging such that the reception path search method selects a maximum value of a prescribed number more than one in order of the largeness from among said fading vector plotted in every reception timing in connection with respective these delay profiles, before executing the weighted-averaging;

a rotational comparison step for comparing an absolute value of an angle difference between a phase angle of the fading vector which is subjected to the weighted-averaging and a phase angle of a basic vector maintained separately with an angle of a threshold value determined beforehand, before replacing said basic vector by the fading vector which is subjected to the weighted-averaging when the absolute value of said angle difference is larger than said angle of threshold value;

an in-phase-addition step for updating a delay profile which is subjected to the in-phase-addition in such away that when the absolute value of said angle difference is judged said angle difference is not larger than said angle of threshold value in such the rotational comparison step, the fading vector of said delay profile providing the fading vector which is subjected to the weighted-averaging is executed a vector-addition in every reception timing to a fading vector of the delay profile which is subjected to the in-phase-addition maintained separately, while when the absolute value of said angle difference is judged said angle difference is larger than said angle of threshold value in such the rotational comparison step, said in-phase-addition step outputs the delay profile which is subjected to the in-phase-addition, as well as said in-phase-addition step updates said delay profile which is subjected to the in-phase-addition while replacing it with said delay profile providing the fading vector which is subjected to the weighted-averaging;

a power-addition step for calculating to be maintained delay profile which is subjected to a power-addition in such a way that said power-addition step executes cumulative addition of a power value of fading vector in every reception timing of the delay profile which is subjected to the in-phase-addition which is outputted in said in-phase-addition step;

a delay profile outputting step for outputting delay profile which is subjected to the power-addition which is calculated to be maintained in said power-addition step whenever the number of times of generation of delay profile generated in every fixed cycle in said delay profile generating step comes to the number of times determined beforehand; and a reception path selecting step for selecting the most suitable reception timing of one or plural numbers based on the delay profile outputted in said delay profile outputting step, before outputting as a reception path.

3. A reception path search method as claimed in claim 2, wherein when said rotational comparison step judges that the absolute value of said angle difference is not larger than said angle of threshold value, said rotational comparison step does not execute updating of said basic vector.

4. A reception path search method as claimed in claim 2, wherein when said rotational comparison step judges that the absolute value of said angle difference is not larger than said angle of threshold value, said rotational comparison step updates said basic vector, while executing vector-addition such that said rotational comparison step executes vector-addition between the fading vector which is subjected to the weighted-averaging and said basic vector.

5. A reception path search method as claimed in claim 2, wherein in the cases where said delay profile outputting step outputs the delay profile which is subjected to the power-addition, the delay profile which is subjected to the in-phase-addition in said in-phase-addition step is maintained on that occasion, in such the case, said delay profile outputting step executes the power-addition between the delay profile which is subjected to the in-phase-addition and the delay profile which is subjected to the power-addition, before outputting, and said delay profile outputting step clears the maintained delay profile which is subjected to the power-addition.

6. A reception path search method as claimed in claim 2, wherein when said power-addition step executes cumulative addition in every reception timing in connection with power value of the fading vector in every reception timing of the delay profile which is subjected to the in-phase-addition in said in-phase-addition step, said power-addition step executes appropriate weighting cumulative addition in consideration of number of the in-phase-addition in said in-phase-addition step of the delay profile which is subjected to the in-phase-addition.

7. A searcher circuit of CDMA (Code Division Multiple Access) communication system comprising:

a delay profile generator for generating delay profile in every fixed cycle while plotting a fading vector which is obtained in such a way that a reception signal converted into a complex base band signal is subjected to inverse-diffusion using known signal list in every reception timing in relation to fixed range;

a fading vector averaging part for calculating a fading vector which is subjected to a weighted-averaging in such a way that said fading vector averaging part selects maximum number of prescribed number more than one in order of the largeness thereof from among said fading vector plotted in every reception timing in connection with respective delay profiles;

a basic vector maintaining part for maintaining a basic vector;

a rotational comparator for comparing an absolute value of an angle difference between a phase angle of said fading vector which is subjected to the weighted-averaging and a phase angle of said basic vector with an angle of threshold value determined beforehand, and replacing said basic vector with the fading vector which is subjected to the weighted-averaging when said absolute value of said angle difference is larger than said angle of threshold value;

an in-phase adder for updating a delay profile which is subjected to the in-phase-addition in such a way that said in-phase adder executes vector-addition between a fading vector of said delay profile generated by said delay profile generator and a maintained fading vector of a maintained delay profile which is subjected to the in-phase-addition in every reception timing, when such control is executed, said in-phase adder outputs said delay profile which is subjected to the in-phase-addition, and said in-phase adder replaces to be updated said delay profile which is subjected to the in-phase-addition by said delay profile generated by said delay profile generator;

a power adder for calculating to be maintained a power-added delay profile which is subjected to the power-addition in such a way that said power adder executes cumulative addition of power value of fading vector of every reception timing of the delay profile which is subjected to the in-phase-addition outputted from said in-phase adder in every reception timing;

a controller for controlling said in-phase adder so as to output said delay profile which is subjected to the in-phase-addition, and so as to replace to be updated said delay profile which is subjected to the in-phase-addition by said delay profile generated by said delay profile generator when said controller judges that the absolute value of the angle difference between the phase angle of the fading vector which is subjected to the weighted-averaging at said rotational comparator and phase angle of the basic vector is larger than said angle of threshold value; and for controlling said power adder so as to output the power-added delay profile which is subjected to the power-addition which is calculated to be maintained in said power adder whenever the number of times of generation of a delay profile generated in every fixed cycle in said delay profile generator comes to the number of times determined beforehand.

8. A searcher circuit of CDMA (Code Division Multiple Access) communication system as claimed in claim 7, wherein said rotational comparator does not update said basic vector when it is judged that the absolute value of the angle difference is not larger than said angle of threshold value.

9. A searcher circuit of CDMA (Code Division Multiple Access) communication system as claimed in claim 7, wherein said rotational comparator updates said basic vector while executing vector-addition between said fading vector which is subjected to the weighted-averaging and said basic vector when it is judged that the absolute value of the angle difference is not larger than said angle of threshold value.

10. A searcher circuit of CDMA (Code Division Multiple Access) communication system as claimed in claim 7, wherein when said controller causes said power adder to be controlled so as to output said power-added delay profile which is subjected to the power-addition, on this occasion, if said delay profile which is subjected to the in-phase-addition is maintained, said controller executes the power-addition between said delay profile which is subjected to the in-phase-addition and the power-added delay profile which is subjected to the power-addition before outputting it and said controller controls said power adder so as to clear the maintained power-added delay profile which is subjected to the power-addition.

11. A searcher circuit of CDMA (Code Division Multiple Access) communication system as claimed in claim 7, wherein when said power adder executes appropriate weighting cumulative addition in consideration of the number of times of the in-phase-addition in said in-phase adder of the delay profile which is subjected to the in-phase-addition, said power adder executes cumulative addition of power value of the fading vector of every reception timing of the delay profile which is subjected to the in-phase-addition outputted from said in-phase adder in every reception timing.

* * * * *